Dec. 17, 1963  H. E. R. GRUNER  3,114,283
LIGHT SENSING METHOD AND APPARATUS THEREFOR
Filed Oct. 31, 1960

INVENTOR.
HEINZ E. R. GRUNER
BY *Frank C. Parks*
*David E. Dougherty*
ATTORNEYS

United States Patent Office 3,114,283
Patented Dec. 17, 1963

3,114,283
LIGHT SENSING METHOD AND APPARATUS
THEREFOR
Heinz E. R. Gruner, Irondequoit, N.Y., assignor to
Bausch & Lomb Incorporated, Rochester, N.Y., a corporation of New York
Filed Oct. 31, 1960, Ser. No. 66,044
2 Claims. (Cl. 88—24)

This invention relates to a novel light sensing method and apparatus therefor, and more particularly to a method and apparatus for measuring light intensity in a photographic projector, or enlarger, for exposure control.

The method and devices of the present invention are especially advantageous for use in automatic dodging for contrast and exposure control in photographic enlargers of the type having a flying spot source of projection illumination. Previous automatic dodging arrangements for use in conjunction with enlargers of this type have been proposed. See, for example, the system described by Craig in U.S. Patent No. 2,842,025.

In this type of system it is difficult to compensate for variations due to differences in the spacings between the photosensor and various different portions of the field traversed by the flying spot. It is also difficult to arrange such a system for use when the projection is to be made upon an opaque surface. In such cases, the control must be by reflected light, and changes in the angle of incidence of the flying spot are apt to produce large variations in the control signal.

Parallax also presents a serious problem in dodging when using a cathode ray tube to generate the flying spot of light. A portion of the negative projected by the point light source lies along a line drawn from the point source to the center of the projection lens. Since the point light source is at a considerable distance from the negative being projected, a photosensor or transducer placed beside the lens and facing the negative, senses the point source through a different portion of the negative from the portion being projected.

The present invention provides a novel method and apparatus for measuring the light intensity of a projected image in a photographic enlarger, which overcomes to a high degree many of the disadvantages of previous methods and apparatus.

Accordingly, the method and apparatus described herein are effective to minimize errors due to parallax, to compensate for over-or-under exposure, to modify the light intensity in response to changes of density between successive negative portions being projected, to control picture contrast, and to compensate for exposure variations due to picture shape distortion in rectification.

The method and devices of the present invention are particularly well suited for photogrammetric enlargers, or other enlargers of the type having a flying spot source of projection illumination, since they are relatively unaffected by variations in the reflected light intensity caused by the movement of the flying spot with respect to a curved projection lens.

The invention will now be described in detail in connection with the accompanying drawings, in which.

Figure 1:
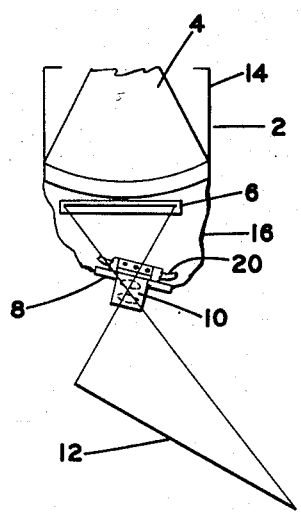
FIG. 1 is a schematic cross-sectional view of an enlarger and a light sensing device mounted therein including an array of optical pickup elements according to the invention.
Figure 3:
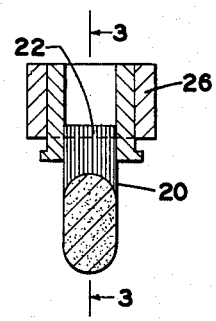
FIG. 3 is an enlarged cross sectional view taken along the line 3—3 in FIG. 2.
Figure 2:
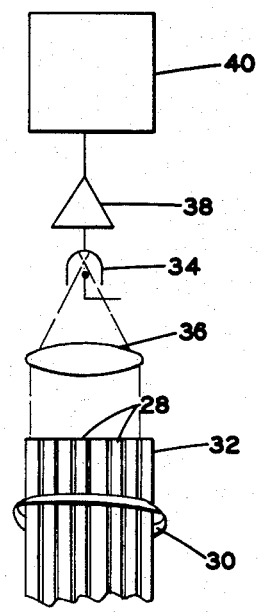
FIG. 2 is a schematic plan view on an enlarged scale of the array of optical pickup elements shown in FIG. 1.
Figure 2:
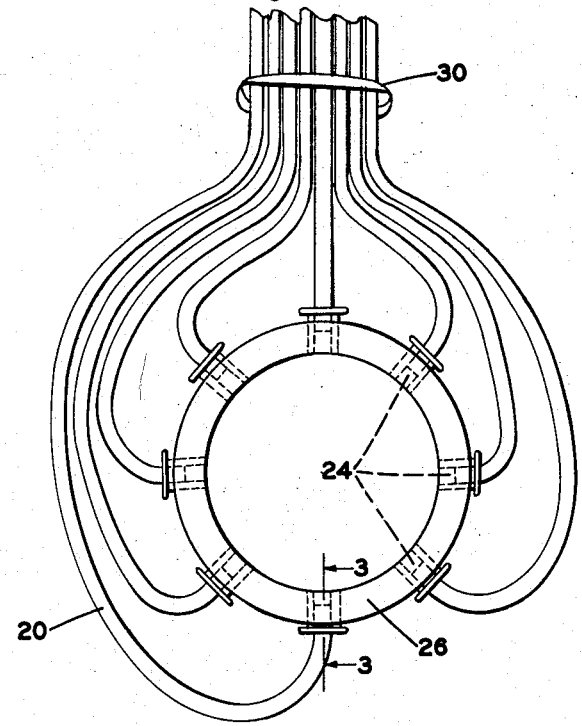

In accordance with the method of the present invention, a photosensor is arranged to sense light reflected in the back direction from the objective lens of a photographic enlarger, thereby providing an indication of the field illumination in the projector or enlarger during an exposure. The sensor output may be connected to any desired control circuit for automatically controlling the exposure without the need for preliminary readings. The preferred method includes the step of sensing light reflected in various different directions from the lens, and producing a signal indicative of the average intensity of the light reflected in the various different directions. The method provides a measure of the intensity of the light actually passing through the projection center of the enlarger, regardless of the direction from which it comes, thus minimizing errors due to differences caused by parallax, or by the illumination direction, and lens curvature.

Referring now to the drawing, which illustrates a preferred embodiment of the invention, a conventional photographic enlarger 2 of the type commonly used for photogrammetric rectification is shown therein. The enlarger 2 includes a cathode ray tube light source 4, a film holder 6, a lens board 8, and a projection lens 10 mounted on the lens board 8. An easel 12, a housing 14 and a bellows 16 are shown in their customary arrangement.

In accordance with the invention, a plurality of optional pickup elements 20 are angularly spaced around the periphery of the projection lens 10 in radial array facing the projection lens 10. The entrant faces 22, of the optical pickup elements facing the projection lens 10, are mounted in radial holes 24, in a ring 26, which is fixed to the lens board 8, coaxially with the lens 10. The faces of the optical pickup elements are recessed in the ring 26, so that the ring 26 acts as a light shield to limit the acceptance angles of the elements 20, and prevent direct rays from the light source 4 from entering the elements 20. It is desirable to have the optical paths between the pickup faces and the exit faces of equal lengths in order to equalize the light losses occurring within the individual elements.

The exit faces 28 of the optical pickup elements are fused together, or secured by the bands 30 to form a single bundle 32, the exit face 28 faces a photoelectric transducer 34 such as a photomultiplier vacuum tube. A field lens 36 may be disposed between the bundle 32 and the transducer 34 for maximizing the light signal transmitted to the transducer.

An amplifier 38 is connected between the output of the photomultiplier tube 34 and a control circuit 40. The control circuit 40 may be arranged to control the light intensity, illumination time, or aperture opening of the enlarger, or the scanning speed when used in an enlarger having a flying spot light source. The control circuit may be of any desired type, and does not per se constitute the present invention.

In operation of the enlarger, a portion of the field illumination is unavoidably reflected from the back surface of the projection lens. It is this reflected portion of the field illumination that is used in the practice of the invention to measure the total field illumination.

The reflected light enters the optical pickup elements 20 and is directed thereby to the common transducer 34. The transducer 34 produces an electrical signal for exposure control, which may be accomplished by varying the cathode ray tube intensity or scanning speed, or otherwise.

The array of optical pickup elements may be made of light transmitting rods such as Lucite, or other material which is capable of light transmission by total internal reflection. It is also contemplated that the light rays may be picked up and directed to the transducer by a system of mirrors, or separate transducers may be spaced around the lens in place of the pickup elements, in which case the transducers would all be connected to a common output.

Preferably, the array is made of bundles of optical fibers having their entrant faces radially spaced about the projection lens and their exit faces on a common surface facing the transducer. The arrangement may, alternatively, be regarded as a single furcate bundle having its legs radially spaced about the projection lens.

The use of plural pickup elements is also preferred because the absolute value of the reflected light is often relatively small compared to the value of the projection illumination, and plural elements produce a larger signal than a single element.

The optical pickup elements 20 which are placed around the projection lens 10 gather the light from various portions of and from different viewing angles relative to the projection lens 10. The light signal is transmitted to the exit faces 28 of the bundle 32 so that the total light signal picked up by all the elements 20 is directed onto the photomultiplier tube 34. The signal produced by the photomultiplier tube 34 represents the average light intensity reflected from the various different pickups and the value corresponds to the imaging light passing through the lens.

It is within the scope of this invention to use a single pickup element, or a photoelectric transducer to sense the light reflected by the back surface of the projection lens. A single pickup element is particularly applicable for ordinary enlargers with full field illumination.

What is claimed is:

1. In a photographic projector of the type having a light source for illuminating a primary field and a projection lens for imaging the primary field upon a selected surface, the improvement comprising a plurality of elongated light transmitting members including entrant faces peripherally disposed around the back surface of the projection lens and adapted to receive the light passing through the field and reflected from the back surface of the lens, said elongated optical light transmitting members so constructed and arranged to conduct the light to a common point to thereby provide an averaging effect, detecting means disposed at said common point for producing a signal in response to the imaging light reflected from the surface of the projection lens and means generating a signal adapted for controlling the illumination.

2. A device as described in claim 1, in which, said light transmitting members comprise a furcate bundle of optical fibers.

References Cited in the file of this patent
UNITED STATES PATENTS

| | | |
|---|---|---|
| 2,122,750 | Nicolson | July 5, 1938 |
| 2,616,331 | Pavelle | Nov. 4, 1952 |
| 2,726,173 | Martin | Dec. 6, 1955 |
| 2,759,602 | Baigent | Aug. 21, 1956 |
| 2,804,550 | Artzt | Aug. 27, 1957 |
| 2,843,002 | Allison | July 15, 1958 |